United States Patent
Vana et al.

(10) Patent No.: US 10,964,221 B2
(45) Date of Patent: Mar. 30, 2021

(54) AIRCRAFT GROUND COLLISION AVOIDANCE SYSTEM

(71) Applicant: BOREALIS TECHNICAL LIMITED, North Plains, OR (US)

(72) Inventors: Jan Vana, Prague (CZ); Joseph J. Cox, Portland, OR (US); Isaiah W. Cox, London (GB)

(73) Assignee: Borealis Technical Limited, Isle of Man (IM)

( * ) Notice: Subject to any disclaimer, the term of this patent is extended or adjusted under 35 U.S.C. 154(b) by 124 days.

(21) Appl. No.: 16/124,468

(22) Filed: Sep. 7, 2018

(65) Prior Publication Data
US 2020/0027363 A1    Jan. 23, 2020

Related U.S. Application Data

(60) Provisional application No. 62/555,173, filed on Sep. 7, 2017.

(51) Int. Cl.
*G08G 5/06* (2006.01)
*G05D 1/00* (2006.01)
(Continued)

(52) U.S. Cl.
CPC ........... *G08G 5/065* (2013.01); *G05D 1/0027* (2013.01); *G05D 1/0033* (2013.01);
(Continued)

(58) Field of Classification Search
CPC ...... B64D 43/00; B64D 45/00; G08G 5/0013; G08G 5/0021; G08G 5/0043; G08G 5/045;
(Continued)

(56) References Cited

U.S. PATENT DOCUMENTS 6,665,063 B2    12/2003 Jamieson et al.
8,867,025 B1 *  10/2014 Smalls ............... G08G 5/04
                                                           356/28
(Continued)

FOREIGN PATENT DOCUMENTS

| EP | 2669194 A2 | 4/2013 |
|---|---|---|
| EP | 2669706 A2 | 4/2013 |
| EP | 2806288 A1 | 11/2014 |

OTHER PUBLICATIONS

Neptec Technologies—LIDAR, http://www.neptectechnologies.com/industries/ (2017).
(Continued)

*Primary Examiner* — Atul Trivedi

(57) ABSTRACT

An improved ground collision avoidance system and method is provided for aircraft driven during ground operations by electric taxi drive systems. One or more monitoring devices employing scanning LiDAR technology may be mounted in exterior locations on or near aircraft landing gears or aerodynamically in locations on the aircraft fuselage selected to generate panoramic three-dimensional images from any point of view within or without the aircraft as the aircraft is driven independently within an airport ramp area. The point of view images are transmitted in real time to displays in the aircraft cockpit and may be transmitted to displays outside and remote from the aircraft, allowing the pilot and airport personnel to monitor the aircraft moving within the ramp environment and to respond quickly to control the aircraft's electric taxi drive system-powered ground travel to avoid and prevent a potential collision.

19 Claims, 2 Drawing Sheets

(51) Int. Cl.
*G08G 5/00* (2006.01)
*G08G 5/04* (2006.01)

(52) U.S. Cl.
CPC ......... *G08G 5/0013* (2013.01); *G08G 5/0043* (2013.01); *G08G 5/045* (2013.01)

(58) Field of Classification Search
CPC .... G08G 5/065; G05D 1/0027; G05D 1/0033; G01S 17/87; G01S 17/89; G01S 17/93; G01S 17/931; G01S 17/933
USPC .............................................................. 701/3
See application file for complete search history.

(56) References Cited

U.S. PATENT DOCUMENTS

| | | | |
|---|---|---|---|
| 9,091,762 B2 | 7/2015 | Knight | |
| 9,394,059 B2 | 7/2016 | Cox et al. | |
| 2009/0174591 A1* | 7/2009 | Cornic | G01S 13/44 342/29 |
| 2010/0131126 A1* | 5/2010 | He | G06T 11/20 701/14 |
| 2011/0200974 A1* | 8/2011 | Gluck | G09B 9/46 434/30 |
| 2013/0127642 A1 | 5/2013 | Maggiore et al. | |
| 2014/0142838 A1* | 5/2014 | Durand | G08G 5/045 701/301 |
| 2014/0278037 A1* | 9/2014 | Choksi | G08G 5/065 701/120 |
| 2014/0288815 A1* | 9/2014 | Bousquet | G08G 5/0078 701/301 |
| 2015/0192677 A1 | 7/2015 | Yu et al. | |
| 2015/0193101 A1* | 7/2015 | Mannon | G01S 7/24 715/771 |
| 2015/0194060 A1* | 7/2015 | Mannon | G08G 5/0013 701/301 |
| 2016/0125746 A1* | 5/2016 | Kunzi | G01S 15/87 701/11 |
| 2016/0167803 A1 | 6/2016 | Cookman et al. | |
| 2016/0196754 A1* | 7/2016 | Surace | G08G 5/0013 701/117 |
| 2016/0247406 A1* | 8/2016 | Khatwa | G01S 19/51 |
| 2017/0036778 A1* | 2/2017 | Lowe | B64F 1/00 |
| 2017/0116867 A1* | 4/2017 | Cherepinsky | B64C 25/34 |
| 2017/0277185 A1* | 9/2017 | Duda | B64D 45/00 |
| 2020/0013301 A1* | 1/2020 | Vana | B64C 25/405 |
| 2020/0082731 A1* | 3/2020 | Choi | G05D 1/106 |
| 2020/0116521 A1* | 4/2020 | Barber | B64D 43/00 |

OTHER PUBLICATIONS

Laser rangefinding: American Airlines installs Safegate airline docking system at O'Hare, http://www.laserfocusworld.com/articles/2010/11/aa-safegate-lidar.html.

* cited by examiner

AIRCRAFT GROUND COLLISION AVOIDANCE SYSTEM

PRIORITY CLAIM

This application claims priority from U.S. Provisional Patent Application No. 62/555,173, filed 7 Sep. 2017, the entire disclosure of which is fully incorporated herein.

FIELD OF THE INVENTION

The present invention relates generally to systems and methods for collision avoidance that increase aircraft ground travel safety and specifically to an improved aircraft ground collision avoidance system useful in aircraft driven with electric taxi drive systems during ground travel in airport ramp areas.

BACKGROUND OF THE INVENTION

Ramp areas at today's airport terminals can be very congested places. Multiple aircraft are simultaneously arriving and departing, ground-based service vehicles and personnel are servicing parked aircraft, and ground crews are directing the arriving and departing aircraft into and out of gates. In addition, entrances and exits between taxiways and these congested ramp areas may themselves become congested as aircraft move into and out of ramp areas to park and transfer passengers and cargo. The avoidance of collisions and similar adverse incidents in these areas requires careful monitoring and control of the locations and movements of aircraft and other vehicles as they are maneuvered within the ramps and at gates, as well as the locations of ramp personnel and equipment during the maneuvering. Whether the aircraft are maneuvering into a parking location or being pushed back at departure, ground crews currently guide the moving aircraft, largely because the pilot and flight crew are not able to see the entire ground environment surrounding the aircraft. The sides and rear of the aircraft exterior, from the ground surface to above the wings, are not visible to the pilot and flight crew from the cockpit. The use of cameras and sensors mounted on exterior locations on aircraft has been helpful. However, despite the availability of these devices, incidents like one reported recently in which a winglet mounted on an aircraft wing tip collided with and damaged the wing of an adjacent aircraft during ground maneuvers within an airport ramp area still occur all too frequently.

The efficiency, speed, and safety of aircraft ramp ground operations, whether during taxi into an airport terminal parking location or during push back out of the parking location, may be adversely affected by the ground congestion found in the ramp areas at most large airports. Multiple airlines concurrently conduct both pushback and arrival operations for multiple aircraft, and aircraft often must park in parking locations with minimal safe clearance. This strains not only the available ground crews and personnel, but also the available equipment. Aircraft turnaround times may be increased significantly when ground personnel and tow bars, adapters, tugs or other equipment are not available when needed.

Driving an aircraft on the ground independently during taxi with pilot-controlled landing gear wheel-mounted electric taxi drive systems or other drive systems without reliance on operation of the aircraft's main engines or the use of tow vehicles has been proposed by Applicant and others. As the pilot controls operation of the electric taxi drive system to maneuver an aircraft independently of engines and tugs during ground travel between a ramp area and a taxiway and within the ramp area, pilot situational awareness may be increased compared to when aircraft are driven with operating engines, which may improve ground operation safety. Additional monitoring of the ground level environment external to the portions of the aircraft not readily visible to the pilot or crew driving the aircraft, however, would improve pilot situational awareness, avoid potential collisions, and enhance safe operation of the aircraft as they are driven independently with electric taxi drive systems into and out of congested airport ramp areas.

Applicant has proposed a monitoring method useful during accelerated pushback for aircraft driven with engines-off taxi systems that includes a plurality of different types of sensing devices mounted on the exterior of the aircraft in U.S. Pat. No. 9,394,059. An obstacle awareness system is described by Jamieson et al. in U.S. Pat. No. 6,665,063 that mounts a plurality of LiDAR and other sensors flush to the fuselage of a high performance helicopter or fixed wing aircraft to scan a complete landing zone area to target obstacles in a known direction while the aircraft is in the air. Airport ramp area monitoring devices and systems are also available, including the Safedock LiDAR docking system mounted on terminal gates to automatically guide pilots into gate parking locations.

Although LiDAR technology may be used with the foregoing methods and systems, it is not suggested that this technology may be part of an aircraft ground collision avoidance system using LiDAR monitoring devices mounted in locations on aircraft that provide expanded views to the cockpit from perspectives inside and outside the aircraft and improved monitoring while the aircraft are driven independently during ground travel in a airport ramp area that does not compromise the aerodynamics of the aircraft during flight. A need exists for such a system to improve ground collision avoidance and overall ground maneuvering safety of aircraft driven independently in airport ramp areas with electric taxi drive systems.

SUMMARY OF THE INVENTION

It is a primary object of the present invention, therefore, to provide an improved aircraft ground collision avoidance system for aircraft driven independently with electric taxi drive systems using LiDAR monitoring devices to provide expanded views to the cockpit from perspectives inside and outside the aircraft and improved monitoring of the aircraft exterior and adjacent ground environment as the aircraft are driven independently during ground travel in an airport ramp area.

It is another object of the present invention to provide an improved aircraft ground collision avoidance system with monitoring devices positioned in locations on the aircraft exterior to provide an optimal panoramic view of the aircraft's exterior ground environment to the cockpit during electric taxi drive system-controlled ground travel that do not compromise the aerodynamics of the aircraft during flight.

It is another object of the present invention to provide an improved ground collision avoidance system for aircraft driven independently with electric taxi drive systems during ground operations in an airport ramp area that provides a panoramic view of the ramp area to the aircraft cockpit from any selected perspective or point of view on the aircraft and from any selected point of view from outside the aircraft.

It is an additional object of the present invention to provide an improved ground collision avoidance system for aircraft driven during ground maneuvers into, within, and out of an airport ramp area by electric taxi drive systems that incorporates scanning LiDAR monitoring and processing technology into an improved monitoring system to provide a panoramic three-dimensional display of the monitored space viewable by a pilot in the aircraft cockpit.

It is a further object of the present invention to provide an improved ground collision avoidance system for aircraft driven during ground maneuvers by electric taxi drive systems that mounts LIDAR devices on or incorporates such monitoring devices into aircraft landing gear structures so that the monitoring devices are positioned to obtain and provide information relating to a desired view around the aircraft as the aircraft are driven in a ramp area, and the LiDAR devices are then positioned out of the aircraft's slipstream while the aircraft is in flight.

It is a further object of the present invention to provide an improved ground collision avoidance method for aircraft driven by electric taxi drive systems that integrally employs LIDAR sensing and monitoring devices and processing technology to guide pilot-controlled ground maneuvers and to avoid collisions with other aircraft, ground vehicles, equipment, or personnel as the aircraft is driven into, within, and out of airport ramp areas.

It is yet a further object of the present invention to provide an improved aircraft ground collision avoidance system and method that incorporates LiDAR technology designed to signal safety and hazard zones during aircraft ground travel into, within, and out of an airport ramp area to the cockpit in a moving aircraft and to Air Traffic Control monitoring the airport ramp environment.

It is yet an additional object of the present invention to provide an improved aircraft ground collision avoidance system that employs scanning LiDAR devices and processing technology to generate a view of an aircraft within a ramp area ground environment from one or more points of view within or without the aircraft and transmit processed data and images from the points of view to a shareable display screen in the aircraft cockpit that can be accessed by authorized users inside the aircraft and outside the aircraft.

It is yet another object of the present invention to provide an improved ground collision avoidance system that improves the efficiency of airside operations at an airport by integrating monitoring by on aircraft LiDAR devices and multiple shareable display screens with visual representations of the ramp area monitored accessible to pilots and flight crew, ground control personnel, and air traffic control personnel so that ground support equipment and other equipment may be better utilized as aircraft are driven with electric taxi drive systems within the airport ramp.

In accordance with the aforesaid objects, an improved ground collision avoidance system for aircraft driven independently during ground operations with electric taxi drive systems is provided. One or more monitoring devices that employ scanning LiDAR technology may be mounted in exterior locations on or near an aircraft's nose landing gear and main landing gears or aerodynamically on the aircraft fuselage that are optimally selected to generate panoramic three-dimensional images from any point of view within the aircraft and from any point of view outside the aircraft as the aircraft is driven with the electric taxi drive system into, within, and out of an airport ramp area. The point of view images may be processed and transmitted to a display with a shareable screen in the cockpit in real time that provides the capability for the pilot, as well as authorized personnel outside the aircraft, to view the screen and control the aircraft's ground travel as required to avoid or prevent collisions as the aircraft is driven with the electric taxi drive systems. A method for improved ground collision avoidance during independent aircraft ground travel within an aircraft ramp area with the scanning LiDAR devices that improves the efficiency of airside operations at an airport is also provided.

The monitoring devices may be mounted in a single exterior location or in multiple exterior locations on an aircraft's nose landing gear and/or main landing gears and on structures connected with or attached to the nose and main landing gears or on locations on the aircraft fuselage. The exterior mounting locations for the LiDAR monitoring devices may be optimally selected to generate images and provide the point of view information from perspectives both inside and outside the aircraft as the aircraft is driven in the ramp area and also to ensure that the monitoring devices are located out of the aircraft's slipstream during flight.

Other objects and advantages will be apparent from the following description, claims, and drawings.

DESCRIPTION OF THE INVENTION

Figure 1:
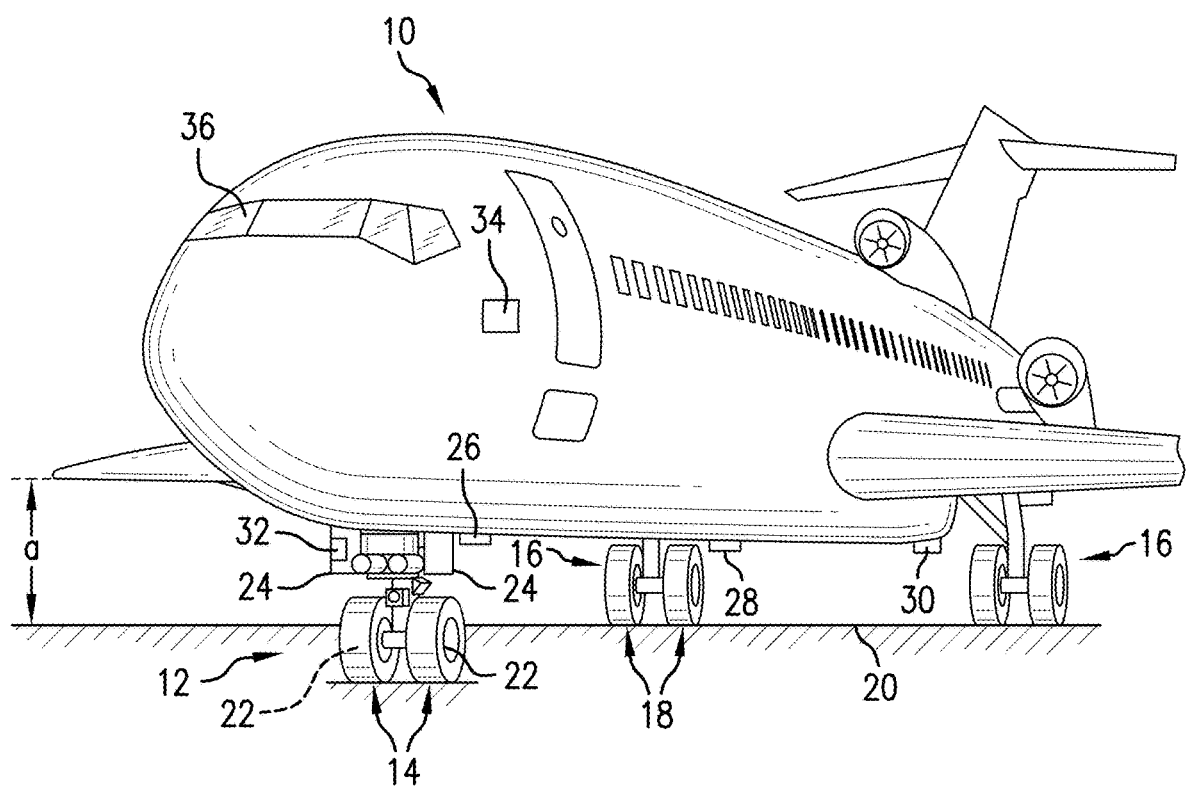
FIG. 1 is a front and side perspective view of an aircraft equipped with an electric taxi drive system for independent ground travel and the improved aircraft ground collision avoidance system of the present invention as the aircraft would appear on a ground surface in an airport ramp area and schematically shows possible locations for the LiDAR monitoring devices on the aircraft's exterior.

The movement of aircraft into, out of, and within congested airport ramp areas while avoiding collisions and other adverse incidents is critical to maintaining the safety of all persons and vehicles in this portion of an airport. Monitoring the ground travel environment of aircraft that are moving in these congested areas will help to prevent collisions between moving aircraft and other moving or stationary vehicles and personnel, significantly improving the safety and efficiency of airport airside and ramp ground operations. Monitoring systems that improve situational awareness as aircraft pilots and flight crew are driving an aircraft during ramp ground operations by providing a clear view of the spatial environment around the moving aircraft from the cockpit and from other locations or perspectives inside or outside the aircraft will enable the pilot or crew to control the aircraft's electric taxi drive system more quickly than has been possible to avoid a potential collision incident and to prevent collisions between aircraft and between aircraft and ground support equipment and other sources of potential ground collision incidents.

The terms "ramp" or "ramp area" will be used herein to refer to the airside area at an airport that is intended to accommodate aircraft for the loading and unloading of passengers, mail, cargo, fueling, parking, or maintenance and is synonymous with the term "apron," which is also used to identify this area at an airport.

"Electric taxi drive systems" refer to pilot-controllable systems used to drive aircraft independently of operation of aircraft engines and external tow vehicles that include landing gear wheel-mounted electric drive motors activatable to drive the aircraft during ground travel in response to pilot control. An example of an electric taxi system developed by Applicant to drive an aircraft independently during ground travel without reliance on operation of the aircraft's engines or attachment to external tow vehicles is described in commonly owned U.S. Patent Application Publication No. US 2016/0167803, the disclosure of which is fully incorporated herein in its entirety by reference. Other drive systems using drive motors that are not electric, including, for example, hydraulic or pneumatic drive motors may also drive aircraft in connection with the improved collision avoidance system and method of the present invention and are contemplated to be included within the terms "electric taxi drive systems."

"LiDAR" (light detection and ranging) and "LADAR" (laser detection and ranging) are used interchangeably to refer to a light or laser-based technology that may provide a three-dimensional field of view of a designated target area. "LiDAR" as used herein is also intended to encompass "LIDAR" or "LADAR."

LiDAR is a laser-based method that measures distances between a sensor and a reflecting object and works in conjunction with appropriate data processing to detect locations of solid objects that range in size from, for example, material that may be described as foreign object debris on an airport ground surface to aircraft from distances of up to several hundred meters. LiDAR is capable of higher spatial resolution than radar and does not depend on the presence of light, even when operating to scan objects during adverse weather conditions. Many LiDAR scanners are designed to perform in extreme physical environments and to penetrate dust, smoke, fog, and rain. The Prototype 360 Scanning LiDAR developed for planetary rover applications by Neptec of Ontario, Canada, provides a three-dimensional field of view with an azimuth of 360° azimuth and an elevation of 45°. Information can be obtained with the Prototype 360 Scanning LiDAR located at distances from a target of up to 1 kilometer, depending on the frequency. It is contemplated that the improved aircraft ground collision avoidance system and method of the present invention will incorporate this or similar three-dimensional scanning LiDAR sensing and monitoring devices that are specifically adapted for use in aircraft powered for ground travel with electric taxi drive systems in accordance with the present invention.

The ground movement and travel path of aircraft driven into, within, and out of an airport ramp area is currently monitored and directed by a combination of information available to the pilot and flight crew. This information may range from what the pilot and crew are able to view and observe directly from the cockpit windows, from information communicated by sensors attached to the aircraft exterior to the cockpit, from audio and/or visual communications from ground personnel to the cockpit, and from ground control and air traffic control communications. As noted above, there are portions of the aircraft exterior and the spatial environment around the aircraft that are not visible from the cockpit, and the pilot or crew does not have a clear, complete, and unobstructed line of sight from the aircraft nose to the tailskid during ground travel. Sensors, including proximity sensors, and video cameras mounted on an aircraft's wing tips and fuselage may help to communicate some kinds of information to the cockpit from these locations. When adverse weather or environmental conditions limit visibility around an aircraft moving into the ramp area, the usefulness of such sensors may also be very limited, and the presence of other aircraft, vehicles, and persons in the ramp area may not be detected or communicated to the cockpit. The improved aircraft ground collision avoidance system of the present invention overcomes the foregoing limitations and adapts LiDAR sensing and monitoring devices and LiDAR processing technology to provide a panoramic three-dimensional view of the ramp area exterior to the aircraft from any desired perspective or point of view from the interior of an aircraft or from the exterior of the aircraft and to communicate a panoramic three-dimensional image of the desired perspective or point of view to a display in the aircraft cockpit.

Referring to the Drawings, FIG. 1 illustrates, from a front and side perspective, an aircraft 10 equipped with the improved ground collision avoidance system of the present invention. The aircraft 10 has a nose landing gear 12 with a pair of tire-supporting wheels 14 and a pair of main landing gears 16, each with a pair of tire-supporting wheels 18 and is shown on a ground surface 20 in an airport ramp area. The aircraft 10 is equipped with a pilot-controllable electric taxi drive system that powers aircraft ground movement without operating engines and tow vehicles. A preferred electric taxi drive system may include a pair of electric drive motors 22 mounted completely within the wheel volume in each nose landing gear wheel 14 shown on aircraft 10. One or more electric drive motors (not shown) may also or alternatively be mounted within one or more of the main landing gear wheels 18. The electric taxi drive system is controlled by a pilot or the crew of the aircraft from the cockpit to drive an arriving aircraft into the ramp area, maneuver the aircraft within the ramp area into a parking location that may or may not include a passenger loading bridge, and drive a departing aircraft out of the ramp area.

The nose landing gear 12 and the main landing gears 16 on the aircraft 10 are the retractable type of landing gears that are stowed in fuselage or wing wheel well compartments (not shown) while in the aircraft 10 is in flight. This removes the landing gears 12, 16 out of the aircraft's slipstream so that they maintain the aircraft's aerodynamic profile and do not cause parasitic drag during flight. Doors 24, which can be clearly seen on the nose landing gear 12, but are also present on the main landing gears 16, open to allow the nose and main landing gears to extend upon landing so that tires on the tire-supporting wheels (14, 18) may contact the ground surface 20. To maintain the aircraft's aerodynamic profile, the landing gears are retracted after takeoff, and the doors are closed during flight.

The pilot and crew driving the aircraft 10 on the ground with the electric taxi system, or in any other manner, have a relatively limited view and cannot see all of the aircraft's exterior or all of the ramp area environment surrounding the aircraft from the cockpit 36, as described below. Consequently, as the aircraft 10 is driven into, within, and out of the ramp area, the presence of other aircraft, ground vehicles, equipment, and personnel near all portions of the aircraft's exterior that are not visible from the cockpit may pose collision and other hazard risks. As noted above, the video cameras and proximity sensors currently used to help mitigate collision risks do not function equally effectively in all weather and environmental conditions. Additionally, video cameras are presently capable of monitoring only a relatively limited ground space around an aircraft and cannot provide a line of sight from the aircraft nose to the tailskid to those in the aircraft cockpit or to others outside the aircraft that may be responsible for controlling the aircraft's movement within the ramp.

In accordance with the present improved aircraft ground collision avoidance system, a single LiDAR sensing or monitoring device may be located in an exterior position on an aircraft that is selected to produce a panoramic three-dimensional view of selected portions of the aircraft's exterior surfaces, including the fuselage and wings, and the surrounding ramp ground environment from a defined point of view of a pilot or other person inside the aircraft or from a defined point of view from a person outside the aircraft. Further, images within this panoramic three-dimensional view may be generated under any weather and light conditions that may be encountered at an airport ramp. A sensing or monitoring device useful with the present invention may be, for example, one that is similar to the Prototype 360 Scanning LiDAR being developed for planetary rover applications by Neptec, referred to above, specifically adapted for aircraft use in an airport ramp area on aircraft driven independently during ground travel by electric taxi drive systems. The situational awareness and hazard avoidance capabilities of a single scanning LiDAR device may be adapted to avoid collisions and hazards and improve the safety of aircraft as they are driven independently by pilots within airport ramp areas. The panoramic three-dimensional view of the aircraft's ground position within the ramp area may be communicated to the pilot and flight crew in real time as they are driving the aircraft. It is also contemplated that this view may be communicated to others, including, for example without limitation, ground control personnel and air traffic control tower personnel. The LiDAR device may also include software that enables the pilot and cockpit crew to define a desired point or field of view and direct the device to scan a commanded beam trajectory and then produce images within the desired point or field of view. The present improved aircraft ground movement monitoring system may also employ additional LiDAR sensing and monitoring devices to provide multiple fields or points of view.

It is contemplated that the one or more LiDAR devices may be programmed to signal both safety zones and hazard zones within the boundaries of the fields of view to the pilot in the cockpit driving the aircraft, as well as to others outside the aircraft, such as ground control personnel and tower personnel, to whom this information would be helpful. Safety zones and hazard zones may be defined by, for example, aircraft specifications and/or airlines' and airport's standard operating procedures.

The location and position of a scanning LiDAR device on an aircraft fuselage exterior or on a structure attached to the fuselage may be ideally selected to enable the scanning LiDAR device to obtain a panoramic three-dimensional view of a desired portion of the aircraft's exterior environment and the surrounding ramp and to communicate this panoramic three-dimensional view to the cockpit. The scanning LiDAR device may be sized to be mounted in a selected location, including one of the locations discussed below or in another location selected to obtain and communicate the desired point of view or field of view information in real time as the aircraft is driven with the electric taxi drive system into, within, and out of the ramp. Available scanning LiDAR devices weigh about 16 pounds (7.3 kilograms) and measure about 18×7×7 inches (46×17×17 centimeters). The size of the existing devices may present challenges to positioning them in exterior aircraft locations where operation of these devices will provide the most useful information as the aircraft is driven on the ground while keeping them out of the aircraft's slipstream during flight. In accordance with the present invention, it is contemplated that scanning LiDAR devices may be sized to add minimal weight to the aircraft and to facilitate their mounting in any desired location on an aircraft exterior without compromising the aircraft's aerodynamic profile.

The majority of potential collision or other hazard risks near an aircraft driven into, within, and out of a ramp area are likely to be within a volume or space surrounding the aircraft from the ramp area ground surface 20 to just above the aircraft's wings, the approximate vertical distance indicated by the arrow α in FIG. 1. Ideally, scanning LiDAR devices are mounted on aircraft structures in exterior locations that will afford the desired panoramic three-dimensional point of view during ground travel and that will also not interfere with the aircraft's aerodynamic profile during flight. There are a number of potential locations that may meet these criteria on the exterior of an aircraft, in or on the ground-facing portion of the fuselage and structures attached to the ground-facing portion of the fuselage, including nose and/or main landing gear structures. Exemplary ones of these potential locations are shown in FIG. 1. It is contemplated that additional or other locations for the scanning LiDAR devices may also be used in the improved aircraft ground collision avoidance system of the present invention. Locations may be selected for the scanning LiDAR devices so that these devices are capable of scanning, from the selected locations, an area or space external to an aircraft from a point of view inside or outside the aircraft and providing images of the scanned area or space from this point of view to the cockpit and other locations. Scanning LiDAR devices are shown schematically in FIG. 1 and are not drawn to scale.

A scanning LiDAR device 26 may be positioned just aft of the wheel well of the nose landing gear 12, and/or another scanning LiDAR device 28 may be positioned just aft of the main landing gears on the exterior of the aircraft fuselage. An additional location for a scanning LiDAR device 30 may be under the aircraft tailskid (not clearly visible). Since any structures on the aircraft fuselage exterior in these locations may be in the aircraft slipstream, the configurations of the scanning LiDAR devices 26, 28, and 30 must be aerodynamic and not interfere with aircraft's slipstream. Another approach is to design the scanning LiDAR devices 26, 28, and 30 with structure that makes them extendible from and retractable into the fuselage so that they may be extended to function during aircraft ground movement and retracted during flight, with a fairing or like structure (not shown) covering their locations on the fuselage exterior. The scanning LiDAR devices may also be designed to be pop-down or pop-out devices that extend from the fuselage exterior when in use and are pulled back into the interior when not is use or when the aircraft is in flight. While a single scanning LiDAR device may effectively provide a panoramic three-dimensional view that may enable a pilot to safely maneuver an aircraft in a congested ramp area, mounting more than one scanning LiDAR device in the fuselage locations described may further enhance the safety of pilot-controlled ramp maneuvers.

Other potential locations for one or more scanning LiDAR devices are on the landing gear doors, such as doors 24, that open to enable the nose landing gear 12 to extend while the aircraft is on the ground and then close after the nose landing gear 12 and the main landing gears 16 are retracted for flight. A scanning LiDAR device 32 is shown mounted on or near an interior surface of a nose landing gear door 24. Although it may also be possible to mount a scanning LiDAR device on an exterior surface of a landing gear door or other door, such a structure should be aerodynamic or designed to be out of the aircraft's slipstream during flight. Although not shown, scanning LiDAR devices may be similarly mounted on interiors or exteriors of main landing gear doors and/or on aircraft cargo bay doors (not shown).

Additional or other locations for one or more scanning LiDAR devices are contemplated to be on main landing gear structures, as well as on nose landing gear structures not identified above, for example the forward and/or aft surfaces of one or more of the main landing gear trusses or adjacent to aircraft headlights on forward nose landing gear structures. Locations for the scanning LiDAR devices on landing gear structures must be selected so that the LiDAR devices do not interfere with the extension and retraction of the landing gear or with other landing gear functions, for example aircraft steering.

A single scanning LiDAR device may be capable of providing a panoramic three-dimensional view of an aircraft's exterior and surrounding ramp environment that will enable a pilot to drive the aircraft with the electric taxi drive system safely into, within, and out of an airport ramp area. As noted, mounting more than one scanning LiDAR device in the fuselage locations described herein may increase the information obtained within panoramic three-dimensional views from different perspectives and further avoid and prevent collisions and enhance safety of aircraft ramp movement when this information is processed and then provided to the pilot and cockpit crew. It is additionally contemplated that one or more scanning LiDAR devices may be positioned to obtain a defined point of view from any point within or without the aircraft, to generate panoramic three-dimensional images of the defined point of view, and then to transmit the images to the aircraft cockpit 36. The system may be designed so that a pilot in the cockpit may select a view of the aircraft lower fuselage and then a view of an area a desired distance aft of the aircraft from any distance above the aircraft to be able to see this entire three dimensional area on a single screen. The pilot or crew may also be able to define and select a point of view from the perspective of ground personnel, for example wing walkers and tail walkers, or from the airport terminal, the air traffic control tower, or from any other perspective, and one or more scanning LiDAR devices may be positioned to provide one or more panoramic three dimensional views of the aircraft during ground travel within the ramp area from these perspectives.

The improved aircraft ground movement collision avoidance system of the present invention further includes software and one or more processors, shown schematically at 34, onboard the aircraft to process and provide information from a single scanning LiDAR device, or from multiple scanning LiDAR devices, to the aircraft cockpit 36. The software and onboard processors 34 should also be capable of integrating information obtained by more than one scanning LiDAR device and to provide the integrated information that may be in the form of a display on a screen to the cockpit 36.

The cockpit 36 may include a multiple function display (not shown) that presents the information and panoramic three-dimensional field or fields of view to the pilot and crew. The camera connections and cockpit displays already present in the cockpits of aircraft equipped with video cameras could be adapted to provide views from the scanning LiDAR devices, and these displays may be added where they are not available. The present collision avoidance system may further improve pilot and crew situational awareness by providing screen sharing and screen control functionality as part of the cockpit display showing the view or views and feed from the LiDAR device. The system may permit authorized users inside and outside the aircraft to access the system and see the views and/or feeds communicated to the cockpit. Depending on the permission architecture provided, some users may have read-only access to the system. Other users may be authorized to log in to the system and share the screen, while other authorized users may be able to take control over the screen and the system. Authorized users who have decision-making authority, including pilots inside the aircraft and air traffic control tower personnel or others outside the aircraft and remote from the aircraft, may be authorized to control the screen and system or to take over control of the screen and system as required to improve monitoring of the aircraft and enhance aircraft ground travel safety. The system will preferably always identify the user who is in control and in charge of the screen.

It is further contemplated that some or all of the data produced by the present system may be communicated to any remote or automated interested party external to the aircraft capable of accelerating or enhancing monitoring and improving safety of an aircraft and the ramp environment where the aircraft is being driven by the electric taxi system. The system may additionally provide the views or feed from one or more scanning LiDAR devices on a single aircraft or on all aircraft equipped with the one or more scanning LiDAR devices simultaneously or selectively to ground personnel, tower personnel, airline dispatchers, and others responsible for the safe conduct of ramp operations and prevention of collisions within ramp areas.

Controls for the scanning LiDAR devices and processor may be connected to the controls for the electric taxi drive system, providing pilot control of the ground collision avoidance system with the operation of the electric taxi drive system. It is also contemplated that controls for the ground collision avoidance system may be stand alone controls so that the ground collision avoidance system may be operated at times when the electric taxi drive system is not in operation. It is also contemplated that the aircraft and ground service equipment equipped with the present ground collision avoidance system may be provided with a "kill" switch, a "dead man" switch, or like switch element that may be operated to avoid an imminent collision. Such a switch may be activated automatically, for example by intelligent software in an aircraft's electric taxi drive system or in the digital ramp or ground movement control system. Manual operation of such a switch to stop aircraft ground travel with the electric taxi drive system by an aircraft pilot, ground control personnel, ground service equipment operators, or air traffic controllers could also be provided.

The present improved aircraft ground collision avoidance system also contemplates equipping ground service vehicles and ground support vehicles with LiDAR devices or LiDAR-compatible technology. These devices or technology may be integrated into new or available digital systems that monitor and control ramp around movement of aircraft and other vehicles. The ramp digital systems and the aircraft collision avoidance systems may also be integrated into digital systems used by air traffic control in airport towers to monitor and control ground movement. LiDAR feeds from these additional sources may be transmitted to the cockpit display described above.

Figure 2:
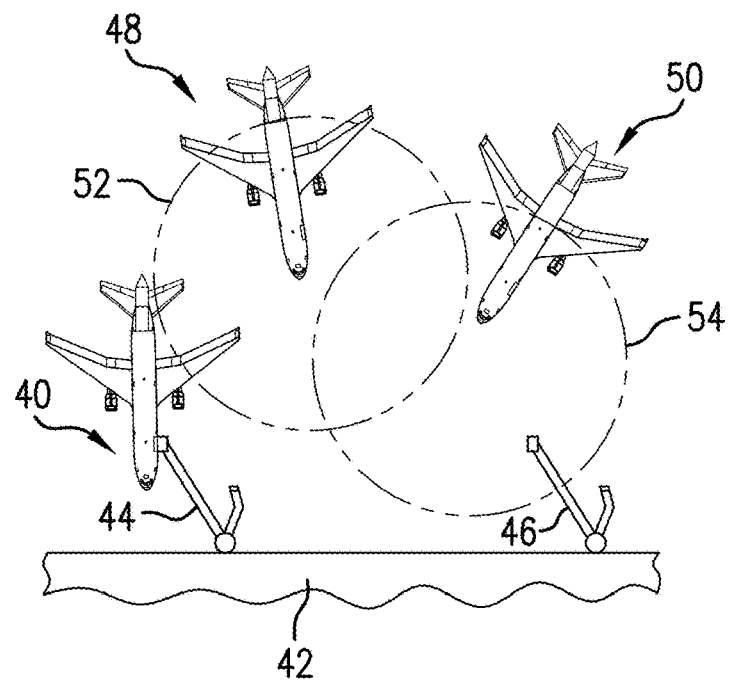
FIG. 2 is a diagrammatic view of aircraft equipped with the improved ground collision avoidance system of the present invention driven in an airport ramp area with electric taxi drive systems showing selected point of view areas monitored as the aircraft are driven into the ramp area.
Figure 3:
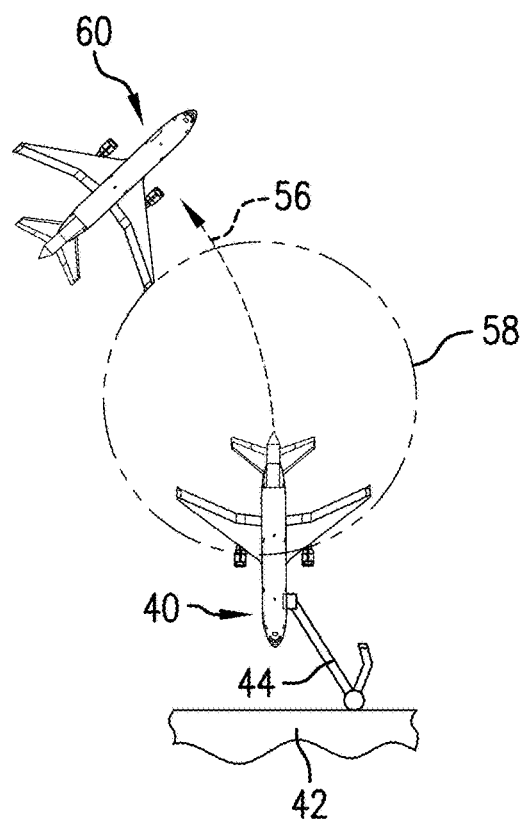
FIG. 3 is a diagrammatic view of aircraft equipped with the improved ground collision avoidance system of the present invention during pushback out of an airport ramp area parking location showing a selected point of view area monitored as an aircraft is driven in reverse with electric taxi drive system during pushback.

FIGS. 2 and 3 illustrate, respectively, aircraft entering an airport ramp area and an aircraft pushing back from an airport ramp parking location to leave a ramp area. The fields of view provided in each situation by scanning LiDAR devices that enable the aircraft to avoid potential collision hazards is also illustrated. The aircraft in FIGS. 2 and 3 are all equipped with electric taxi drive systems for independent ground travel. FIG. 2 shows an aircraft 40 in a ramp area parking location connected to an airport terminal 42 by a passenger loading bridge 44. A passenger loading bridge 46 at the terminal 42 is available for connection to an arriving aircraft. Two aircraft 48 and 50 are being driven into the ramp area by the aircraft electric taxi drive systems to park at the terminal 42. The aircraft 48 and the aircraft 50 are both equipped with one or more scanning LiDAR devices, such as those described above in connection with FIG. 1, preferably mounted on or near the aircraft nose and/or main landing gears, although, as noted above, other locations on the aircraft fuselage may also be used. The circles 52 and 54 indicate the respective three-dimensional areas scanned by a single scanning LiDAR device mounted on each of the aircraft 48 and 50. Visual representations of these panoramic three-dimensional spaces will be projected to display screens in the cockpits of aircraft 48 and 50.

The pilot of aircraft 48 will be able to view the locations of the port wing and tail fin of aircraft 40 relative to the starboard wing of aircraft 48 on a cockpit display screen (not shown). The pilot and crew will be able to change the direction of ground travel to avoid collision between the starboard wing of aircraft 48 and the port tail fin and the port wing of aircraft 40. The pilot of aircraft 50 will be able to see the location of the passenger loading bridge 46 and will be able to change the direction of ground travel to park in an optimum orientation at the passenger loading bridge 46. As the aircraft 48 changes its direction of ground travel to avoid contact with aircraft 40, the presence of aircraft 50 will be detected by the three-dimensional panoramic view from the scanning LiDAR device, and the pilot can control ground travel with the electric taxi drive system to avoid collision with aircraft 50. Although not shown, the ramp area around the aircraft 40, 48, and 50 will also include ground service and support vehicles, equipment, and personnel, and their locations will be detected and then communicated by the scanning LiDAR device to cockpit display screens, and the pilots of aircraft 40, 48, and 50 will be able to change the direction of ground travel or stop ground travel of the aircraft as required to prevent collisions and ground incidents within the ramp area. As noted above, the system may also provide a signal to the pilots of aircraft 48 and 50 to indicate the entrance into and/or the presence of each of the aircraft in a hazard zone. Another signal may be transmitted to indicate the presence of the aircraft in a safety zone. Alternatively, a constant signal, such as a green light, may be provided when the aircraft is driven by the electric taxi system or is stopped in a safety zone, and a different signal, for example a flashing red light or an audible tone, may indicate intrusion into a hazard zone with the potential for a collision involving the aircraft.

FIG. 3 shows aircraft 40 ready for pushback from the passenger loading bridge 44 at the terminal 42. The dashed line 56 indicates a possible ground travel path in the ramp area along which the aircraft 40 may be driven in reverse by the pilot controlling the electric taxi drive system before the aircraft 40 is then driven forward by the electric taxi drive system to a taxiway and takeoff runway. Other pushback ground travel paths, including a path that is perpendicular to the terminal 42, may also be used, depending on the particular ramp configuration. Aircraft 40 is also equipped with one or more scanning LiDAR devices mounted on or near nose and/or main landing gears or in locations on the aircraft fuselage, as described above. The circle 58 represents the panoramic three-dimensional field of view scanned by a scanning LiDAR device, which is transmitted to a display screen in the cockpit where the pilot can see the scanned view. If the pilot continues to drive the aircraft 40 along the ground travel path 56, a collision with aircraft 60 could occur. The pilot will be able to change the ground travel path 56 from that shown or, if necessary, stop the aircraft and prevent a potential collision. FIGS. 2 and 3 represent only a very few examples of possible scenarios in which scanning LiDAR devices mounted to provide panoramic three-dimensional views of portions of aircraft and adjacent ramp areas not otherwise visible to pilots in aircraft cockpits may be used to improve situational awareness of ground travel conditions to the pilots driving the aircraft so that these and other kinds of collisions may be avoided.

As noted above, a system that uses LiDAR to guide aircraft into airport gates is in use at airports in the United States, Europe, and Asia. It is contemplated that the improved collision avoidance system of the present invention could be integrated with the Safedock system attached to airport gates to provide additional improvements in airport airside and ramp operations beyond the improvements in aircraft ground movement possible with the present invention. Processors may be provided that are capable of obtaining and synthesizing information from both the scanning LiDAR devices mounted on the aircraft driven into, within, and out of the ramp area at an airport with electric taxi drive systems and from the Safedock LiDAR devices at gates to guide aircraft into gate parking locations. The capability for using and synthesizing the information from both systems may particularly enhance the safety of ramp operations after dark or during other low visibility conditions, for example fog and heavy rain or snow.

The improved collision avoidance system of the present invention may also be used to enhance efficiency of airport airside operations. As ground movement of aircraft and ground vehicles and equipment is monitored by the LiDAR monitoring devices described herein, the movement of these vehicles may be tracked more accurately by ground control and air traffic control personnel, and ground support vehicles and equipment and other resources may be utilized more efficiently during ramp operations.

Additionally, airport airside maps may be digitized, and artificial intelligence may be used to automate ramp operations. Air traffic control personnel may be given more monitoring and safety control over ramp operations than is currently possible and will be able to remotely and automatically monitor and control ground movement of aircraft driven by electric taxi drive systems and ground vehicles. It is contemplated that a single air traffic control center may use the present improved collision avoidance system with digitized airport airside maps and artificial intelligence to control ramp operations at multiple airsides and airports.

The present invention further includes a method for improving aircraft ground collision avoidance within an airport ramp area when aircraft driven during ramp operations by pilot-controllable electric taxi drive systems are equipped for improved ground movement monitoring with one or more scanning LiDAR devices that are mounted on or near landing gears and other portions of an aircraft not visible to the pilot. The safety of ramp operations for all aircraft, ground vehicles, and ramp personnel may be improved with this method.

The present invention additionally includes a method for improving aircraft ground collision avoidance and preventing collisions between aircraft driven with electric taxi drive systems and other aircraft and ground vehicles within an airport ramp area that monitors an aircraft's ramp environment from points of view inside and outside the aircraft and transmits the data obtained to locations and personnel inside and outside the monitored aircraft responsible for the safety of ramp operations. The data may be transmitted to shareable and/or limited access screens at these locations displaying images of the points of view in real time as described above so that the data may be used to prevent collisions and maintain safety within the ramp area.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability when it is desired to improve the safety of aircraft ground movement, particularly when aircraft are driven into, within, and out of airport ramp areas with electric taxi drive systems, and to increase the likelihood that collisions during aircraft ground movement in airport ramp areas will be avoided.

The invention claimed is:

1. An improved aircraft ground travel collision avoidance system for electric taxi drive system-driven aircraft maneuvering within an airport ramp area that increases safety of aircraft ground maneuvers and ramp area ground operations, comprising:
  a. an aircraft equipped with wing-mounted engines operable for flight and with nose or main landing gear wheel-mounted electric taxi drive systems operable to drive the aircraft during ground travel without operation of said engines, the electric taxi drive systems being controllable by a pilot with controls in a cockpit of the aircraft to drive the aircraft during ground maneuvers within an airport ramp area;
  b. one or more monitoring devices aerodynamically mounted in one or more exterior locations on the aircraft positioned to monitor an environmental space surrounding the aircraft from a ramp ground surface to a height of the aircraft wing not visible to the pilot from the cockpit, the one or more monitoring devices comprising scanning LiDAR devices operable to obtain a real time 360 degree panoramic field of view of the monitored environmental space from a selected point of view during the aircraft ground maneuvers in the airport ramp area; and
  c. a processor onboard the aircraft and software configured and operable to receive real time information from the one or more monitoring devices relating to the real time 360 degree panoramic field of view of the monitored environmental space, to generate a real time visual representation of the panoramic field of view of the monitored environmental space from the selected point of view, and to transmit the generated real time visual representation of the monitored environmental space to a display in the cockpit of the aircraft viewable by the pilot in real time as the pilot controls the electric taxi drive system to maneuver the aircraft during ground travel within said airport ramp area.

2. The system of claim 1, wherein the selected point of view of said monitored environmental space comprises a point of view from inside the aircraft or a point of view from outside the aircraft.

3. The system of claim 1, wherein one of said one or more monitoring devices comprises a scanning LiDAR device having an aerodynamic profile aerodynamically mounted on a ground-facing surface of a fuselage of the aircraft.

4. The system of claim 3, wherein said scanning LiDAR device is aerodynamically mounted on said fuselage ground-facing surface aft of a nose landing gear or aft of main landing gears of said aircraft.

5. The system of claim 3, wherein said scanning LiDAR device is aerodynamically mounted on said fuselage ground-facing surface under a tailskid on said aircraft.

6. The system of claim 1, further comprising an automatically or manually activatable collision avoidance kill switch element in communication with said electric taxi drive systems and said processor.

7. The system of claim 1, further comprising a number of shareable limited access display screens in locations onboard and offboard said aircraft in communication with the processor and operable to receive and share with the pilot and authorized users said transmitted visual representation of the monitored environmental space in real time as said pilot maneuvers said aircraft.

8. The system of claim 1, wherein said one or more exterior locations of said one or more monitoring devices comprise on a nose landing gear door or a main landing gear door interior or exterior surface, and on a ground-facing surface of portions of a fuselage of said aircraft not visible to said pilot from said cockpit.

9. The system of claim 8, wherein said one or more exterior locations comprise on the exterior surface of one or more nose or main landing gear doors, and the one or more scanning LiDAR devices are operable to obtain said 360 degree panoramic three dimensional field of view in real time when said landing gear doors are open and said landing gears are extended.

10. The system of claim 8, wherein said one or more monitoring devices are aerodynamically mounted on said ground-facing surface of the portions of said fuselage to be extendible from said surface of said fuselage to obtain said real time 360 degree panoramic field of view during monitoring and retractable within said fuselage to form an aerodynamic surface on said fuselage when said aircraft is in flight.

11. The system of claim 10, wherein said one or more monitoring devices comprise pop out elements or pop down elements that maintain the aerodynamic surface.

12. The system of claim 1, further comprising multiple ones of said one or more monitoring devices aerodynamically mounted in multiple exterior locations on said aircraft to provide multiple real time 360 degree panoramic fields of view of the monitored environmental space from said selected point of view.

13. The system of claim 1, wherein the one or more scanning LiDAR devices are adapted for aircraft use to have a size that adds a minimal amount of weight to the aircraft and are aerodynamically mounted in one or more exterior locations to be out of a slipstream of the aircraft when the aircraft is in flight.

14. A method that increases ground travel safety of aircraft driven by electric taxi drive systems to maneuver and avoid collisions within an airport ramp area and improves safety of airport ground operations, comprising:

a. providing an aircraft equipped with wing-mounted engines operable for flight and with nose or main landing gear wheel-mounted electric taxi drive systems controllable by a pilot in a cockpit of the aircraft to drive the aircraft without operation of the engines during ground maneuvers in an airport ramp area, providing one or more scanning LiDAR devices aerodynamically mounted in exterior aircraft locations operable with controls in the cockpit to monitor an environmental space surrounding the aircraft extending from a ramp ground surface to a height of wings of the aircraft not visible to the pilot from the aircraft cockpit, and providing a processor onboard the aircraft to receive and process real time information from the one or more scanning LiDAR devices and transmit the real time information to a display in the aircraft cockpit;

b. aerodynamically mounting one or multiple ones of the one or more scanning LiDAR devices in one or more locations on or in a ground-facing surface of a fuselage of the aircraft selected to monitor the environmental space surrounding the aircraft from ramp ground surface to the height of the wings not visible to the pilot and to obtain a 360 degree panoramic field of view of the environmental space surrounding the aircraft from the ramp ground surface to the height of the wings from a selected point of view onboard or offboard the aircraft;

c. controlling the electric taxi drive systems and maneuvering the aircraft with the electric taxi drive systems during ground travel within the ramp area, selecting a point of view of the environmental space surrounding the aircraft operating the one or more scanning LiDAR devices to monitor the environmental space, and obtaining the 360 degree panoramic field of view of the environmental space from the selected point of view in real time as the pilot is maneuvering the aircraft with the electric taxi drive systems;

d. transmitting the obtained 360 degree panoramic field of view information of the monitored environmental space from the selected point of view to the processor in real time, processing the obtained 360 degree panoramic field of view information, and transmitting the processed real time 360 degree panoramic field of view information to the cockpit display in the form of real time three-dimensional images of the monitored environmental space from the selected point of view; and e. viewing the real time three-dimensional visual images on the display by the pilot, and, based on the displayed real time three-dimensional images from the point of view, continuing to drive the aircraft with the electric taxi drive systems along a ramp ground travel path when the images indicate absence of a potential collision hazard, changing direction of aircraft ground travel with the electric taxi drive system when the images indicate a potential collision hazard in the ramp ground travel path, or controlling the electric taxi drive system and stopping aircraft ground travel when the images indicate an imminent ground collision threat.

15. The method of claim 14, wherein the display in the aircraft cockpit comprises a limited access shareable display screen, further providing one or more additional limited access shareable display screens in ramp locations outside the aircraft, limiting full access to and control of the limited access shareable display screens to pilots and to authorized airport personnel responsible for monitoring aircraft ground travel and maintaining safety in the ramp area, viewing the real time three-dimensional images on the cockpit display and on the one or more limited access shareable display screens by the pilots and the authorized airport personnel, and controlling aircraft ramp maneuvers in response to the real time three-dimensional images transmitted to the display screens.

16. The method of claim 14, further comprising aerodynamically mounting one of the one or more scanning LiDAR devices in or on the aircraft fuselage ground-facing surface near a tailskid of the aircraft, selecting the point of view to be a line of sight from a nose of the aircraft to the tailskid, monitoring the line of sight in real time with the scanning LiDAR device, obtaining a real time 360 degree panoramic view of the environmental space along the line of sight from the aircraft nose to the tail skid as the aircraft is maneuvered with the electric taxi drive systems, and processing and transmitting the real time three-dimensional images from the line of sight to the cockpit display.

17. The method of claim 14, further comprising, at an airport ramp area with a LiDAR-based gate docking system at a gate where the aircraft is assigned to park, receiving gate docking information at the processor from the gate docking system, integrating the gate docking information with the real time 360 degree panoramic field of view information of the monitored environmental space obtained from the one or more scanning LiDAR devices, driving the aircraft through the ramp area in response to the integrated information, and parking the aircraft at the assigned gate.

18. The method of claim 14, further comprising defining hazard zones and defining safety zones within the airport ramp area and providing a signal element in the cockpit to communicate to pilot when the processed real time 360 degree panoramic field of view information of the monitored environmental space indicates the the pilot is driving the aircraft with the electric taxi drive systems into a hazard zone.

19. The method of claim 14, further comprising equipping moving and stationary ground service vehicles and ground equipment within the airport ramp area with scanning LiDAR devices to monitor a spatial environment around the ground service vehicles and ground equipment, communicating information from the scanning LiDAR devices relating to a 360 degree field of view of the monitored spatial environment to an air traffic control data system monitoring ground movement in the airport ramp area, and communicating a presence of a potential collision hazard to the pilot driving the aircraft with the electric taxi drive systems, to ground service vehicle and equipment operators, and to air traffic controllers.

* * * * *